E. T. GREENFIELD.
COUPLING.
APPLICATION FILED DEC. 10, 1906.
956,077.
Patented Apr. 26, 1910.
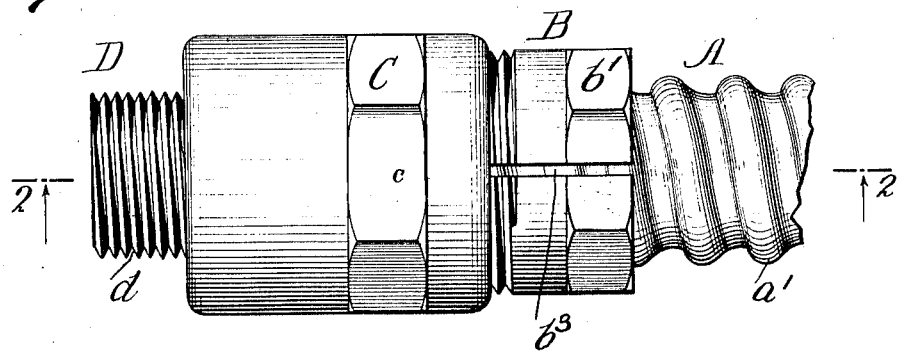
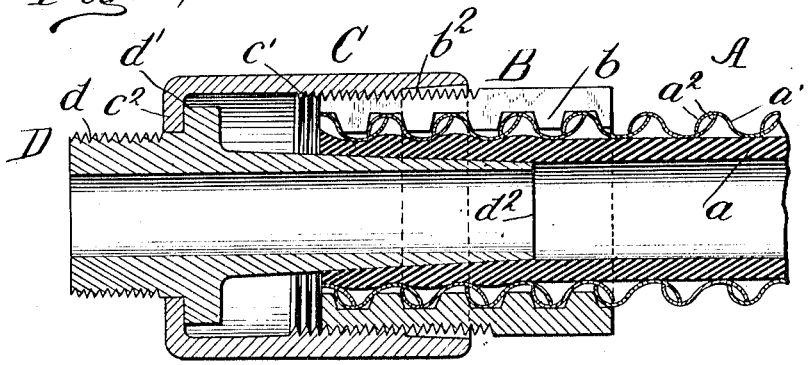
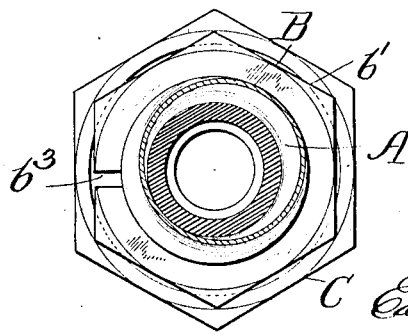

UNITED STATES PATENT OFFICE.

EDWIN T. GREENFIELD, OF KIAMESHA, NEW YORK.

COUPLING.

956,077.

Specification of Letters Patent.   Patented Apr. 26, 1910.

Application filed December 10, 1906. Serial No. 347,140.

*To all whom it may concern:*

Be it known that I, EDWIN T. GREENFIELD, a citizen of the United States, residing at Kiamesha, in the county of Sullivan, State of New York, have invented certain new and useful Improvements in Couplers, of which the following is a specification.

This invention relates to couplers for connecting the end of a length of hose to a hydrant, engine, compressor or to the end of another length of hose.

The object of the invention is to effect certain improvements in the constructon of couplers for this and similar uses to the end that a coupler is provided whereby a connection can be rapidly made which will withstand considerable pressure.

My improved coupler may be used with hose of widely different types but it is particularly adapted for use with that type known as "Greenfield armored hose" consisting of a flexible tube of rubber and fabric and an armoring thereon of spirally-formed metallic strip.

An embodiment of the invention is illustrated in the accompanying drawings in which—

Figure 1 is an elevation of the coupler, secured on the end of a length of hose, Fig. 2 is a longitudinal section of the same and Fig. 3 is an end view of the coupler showing the hose in section.

Referring to the drawings, A indicates a length of armored hose consisting of a flexible tube $a$ of combined rubber and fabric, and an armoring $a'$ thereon. The armoring is formed of sheet-metal strip spiraled tightly upon the tube $a$, the strip being curved transversely before being spiraled to provide flanges $a^2$ at the edges which while permitting relative movement of the several spirals, interlock to preclude excessive movement. Though this construction of hose is preferred, other forms may be used with the coupler as well.

The coupler consists of a split sleeve B, a locking sleeve C and a connecting member D. The sleeve B is interiorly threaded to provide a spiral projection $b$ corresponding in size and pitch to the spiral depression on the outer surface of the hose. On the exterior of the sleeve flattened sides $b'$ are provided adjacent to one end forming a nut and adjacent to the other end, the exterior of the sleeve is threaded at $b^2$. The sleeve is split as indicated at $b^3$. The locking sleeve C has flattened sides $c$ on the exterior thereof forming a nut. On its interior, sleeve C is threaded at $c'$ adjacent to one end to correspond with the threads $b^2$ on sleeve B. At its other end sleeve C has an inwardly projecting integral flange $c^2$.

The connecting member D is of tubular form and has a threaded end $d$ adapted for making connection with the part to which the length of hose is to be connected. Intermediate its ends member D has a flange $d'$ integral therewith, the diameter of which is somewhat greater than the diameter of the opening through the wall $c^2$ of the sleeve C. From the flange $d'$ to the other end of member D, the outer wall thereof is tapered off so that the exterior diameter of member D continually decreases from flange $d'$ to the end $d^2$ thereof.

The manner in which the coupling thus constructed is used will now be explained.

The split sleeve B is first screwed on the end of the hose A until its end alines with the end of the hose and the small end $d^2$ of the connecting member D is inserted in the end of the hose. The locking sleeve C is then passed over the end of the member D until the threads $c'$ thereon engage the threads $b^2$ of split sleeve B and is screwed up thereon. As the threads engage, the flange $c^2$ engages the flange $d'$ and thereafter, screwing up the sleeve C on sleeve B forces the small end $d^2$ of the connecting member D into the end of the hose A. On account of the inclination of the outer wall of the end $d^2$ of the member D, forcing the end into the hose expands the latter somewhat, as shown in Fig. 2, and the pressure of the armoring $a'$ on the interior of split sleeve B causes the latter to expand. This is continued until the end $d^2$ of member D is forced a considerable distance into the hose, expanding the hose and the sleeve B, and until the sleeve is forced into hard engagement with the interior walls of the sleeve C. Great force can be applied to turn sleeve C relatively to sleeve B by employing wrenches gripping the nuts formed by the flattened walls $b'$ and $c$. When the parts have been brought to their final positions, the end of the hose and the sleeve B are squeezed between the part $d^2$ and sleeve C so tightly that turning of sleeve B on the armoring $a'$ is precluded, and the pressure between the end $d^2$ of the member D and the tube $a$ of the hose is so great as to effectually prevent escape of a fluid between them even though it be under considerable pressure.

Having described my invention, what I claim as new therein and desire to secure by Letters Patent of the United States, is:

The combination of a hose consisting of a flexible tube and an armoring thereon formed of a series of metallic, interlocking, relatively movable spirals, and a coupler comprising an exteriorly-threaded sleeve on the hose split throughout its length, a connecting member having a circumferential flange and an elongated tapering end, and a second sleeve on said split sleeve interiorly-threaded to coact with the exteriorly-threaded split sleeve and having a flange coacting with the flange on said connecting member, said sleeves being adapted to be turned relatively to move the connecting member axially of the hose and force the tapered end of the connecting member into the end of the hose to spread the same and the split sleeve thereon and grip them between said tapered end and said outer sleeve, substantially as described.

This specification signed and witnessed this 7th day of December, 1906.

EDWIN T. GREENFIELD.

Witnesses:
HARRY H. HORNSBY,
WM. EDW. HURLEY.